United States Patent [19]

Plaquin et al.

[11] 4,426,105
[45] Jan. 17, 1984

[54] JOINTS FOR PIPES, PARTICULARLY INTENDED FOR THE OIL INDUSTRY

[75] Inventors: Bernard Plaquin; Paul Bounie; Jean Mantelle, all of Aulnoye Aymeries, France

[73] Assignee: Vallourec, Paris, France

[21] Appl. No.: 283,722

[22] Filed: Jul. 15, 1981

[30] Foreign Application Priority Data

Jul. 17, 1980 [FR] France ................. 80 15829

[51] Int. Cl.³ ............... F16L 15/00; F16L 35/00; F16L 39/00; F16L 25/00
[52] U.S. Cl. ........................................... 285/92; 285/3; 285/321; 285/381; 285/390
[58] Field of Search ............... 285/3, 92, 321, 333, 285/334, 355, 390, 381

[56] References Cited

U.S. PATENT DOCUMENTS

| 2,341,670 | 2/1944 | Stinson | 285/334 |
| 2,450,453 | 10/1948 | Boehm | 285/334 X |
| 3,405,956 | 10/1968 | Pierce, Jr. | 285/321 X |
| 3,528,686 | 9/1970 | Nelson | 285/321 X |
| 3,585,803 | 6/1971 | Bardgette | 285/321 X |
| 3,880,451 | 4/1975 | Kinzbach | 285/334 X |

FOREIGN PATENT DOCUMENTS 485139 12/1975 Australia ........................ 285/321

*Primary Examiner*—Richard J. Scanlan, Jr.
*Attorney, Agent, or Firm*—Arnold, White & Durkee

[57] ABSTRACT

Joint for pipes of the type in which an end of a male member (1) provided with a thread is screwed into a female member (2) having a corresponding thread.

On its outer surface, the male member has a circumferential groove (9) and on the inner surface the female member has a circumferential groove (10) which, in the screwed position, faces the groove of the male member. A spring ring (12) is provided to simultaneously engage in the said grooves. At least one of the grooves has an adequate radial depth to permit the retraction of the spring ring when the male member is engaged in the female member.

8 Claims, 10 Drawing Figures

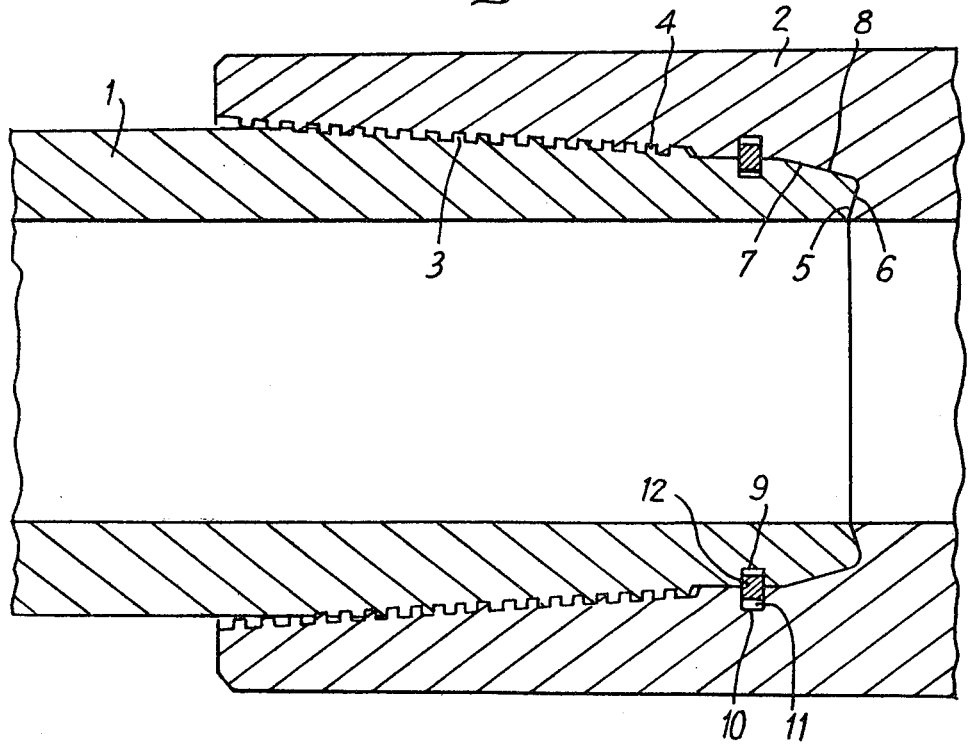
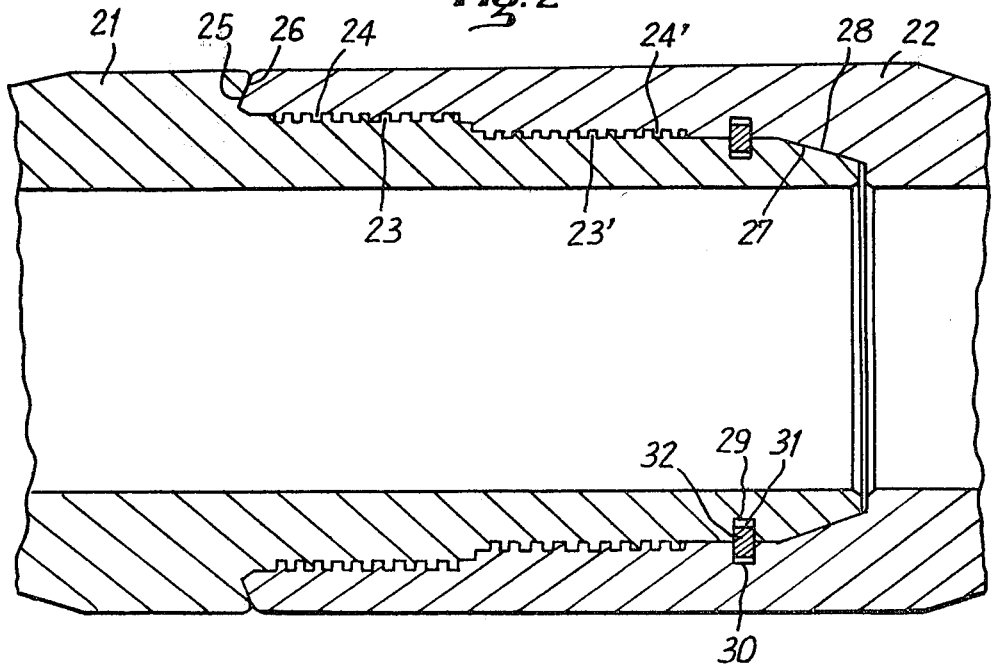

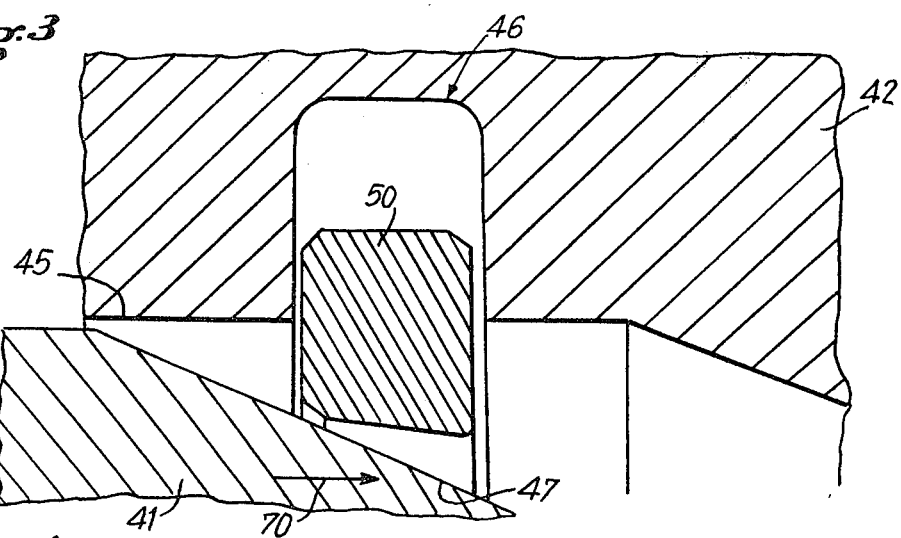
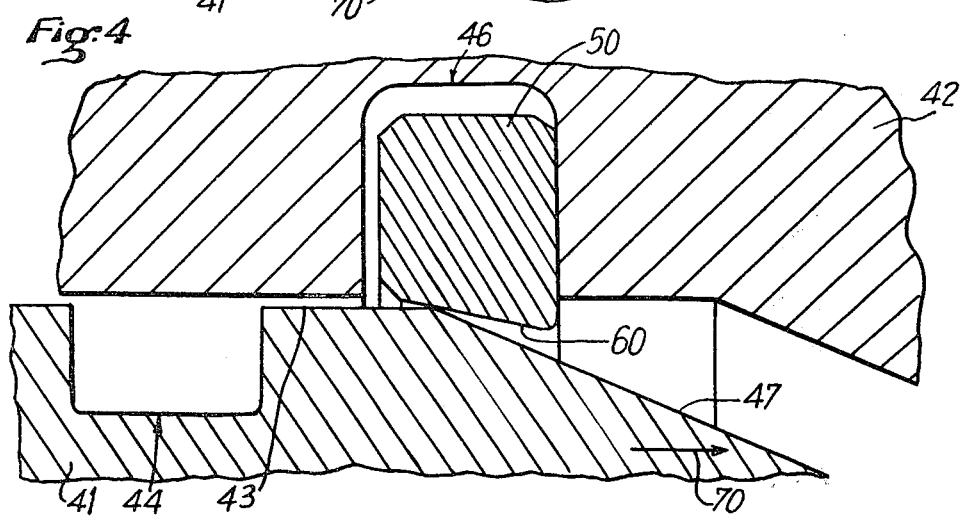
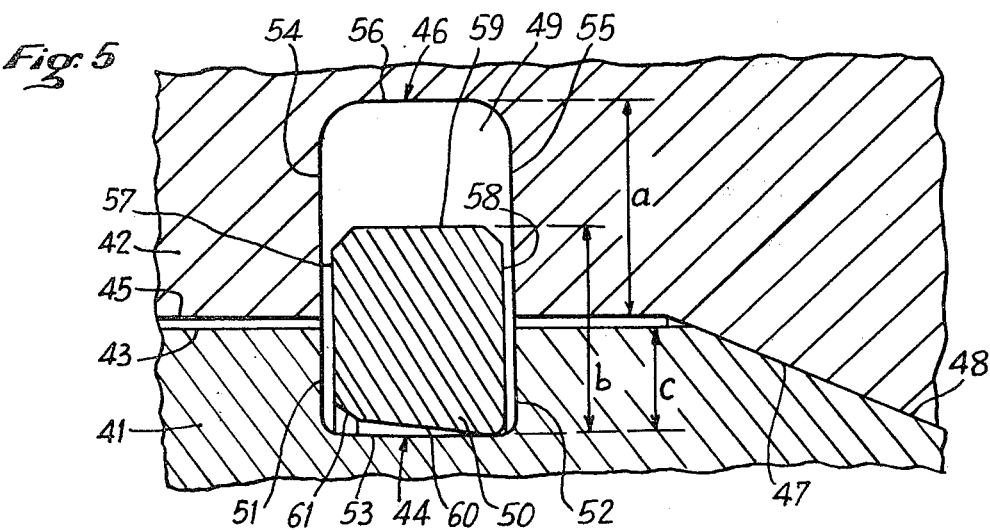

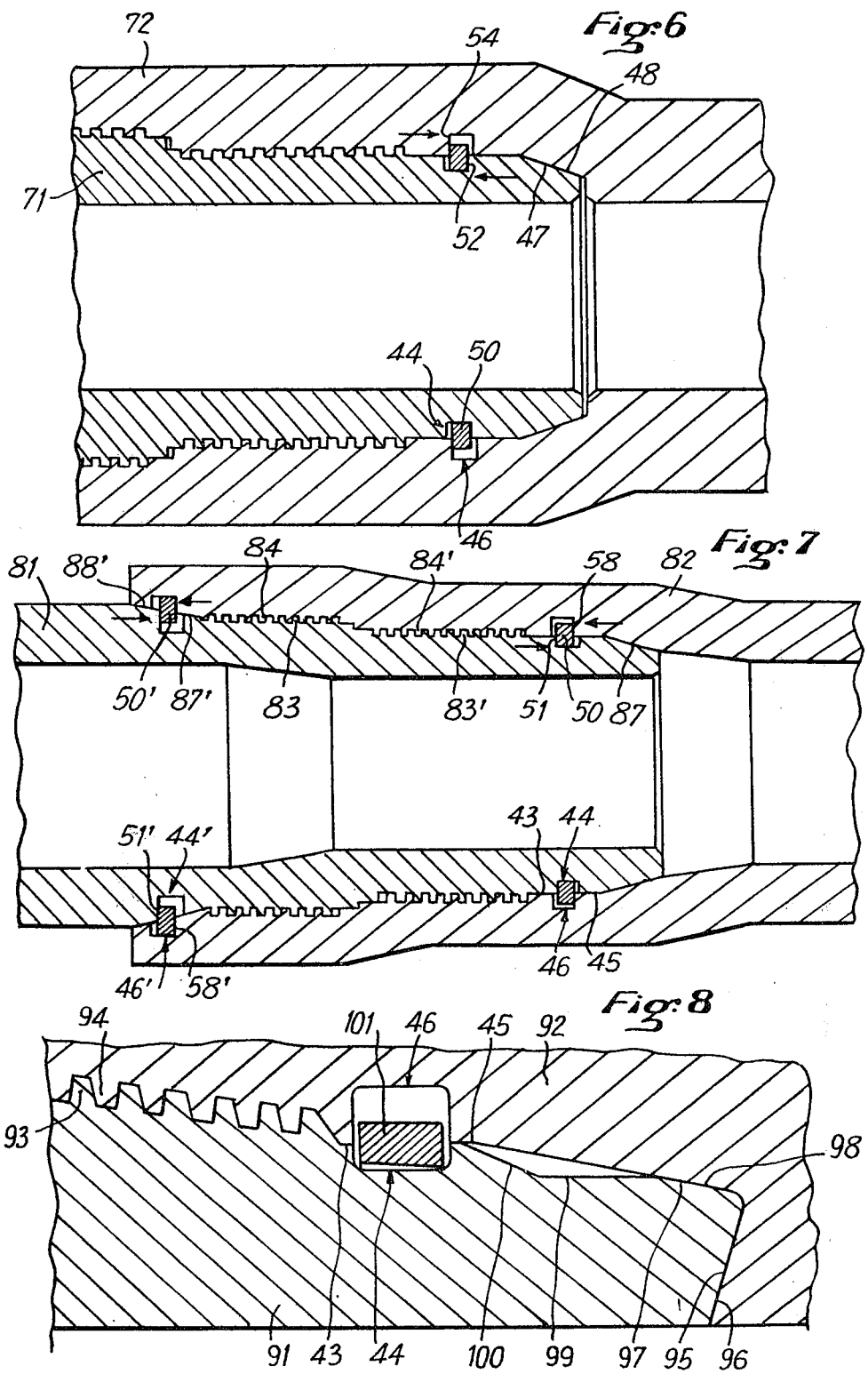

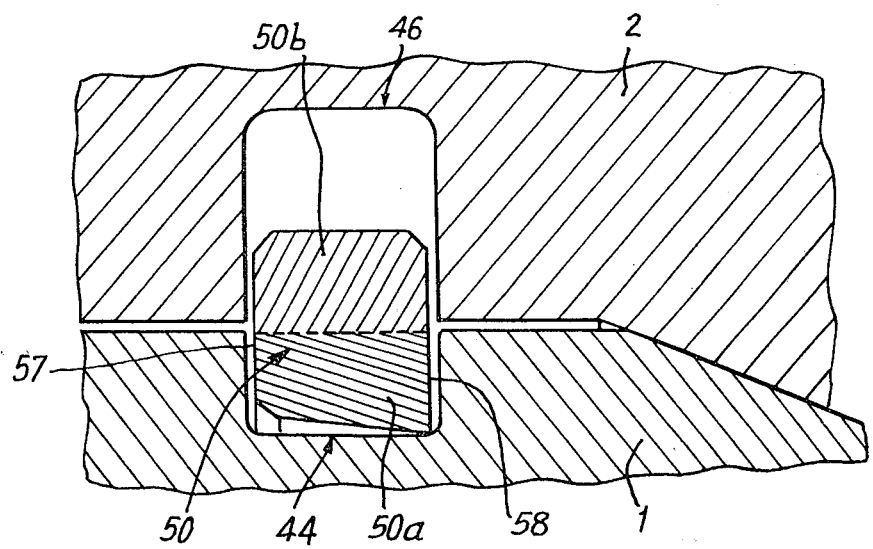
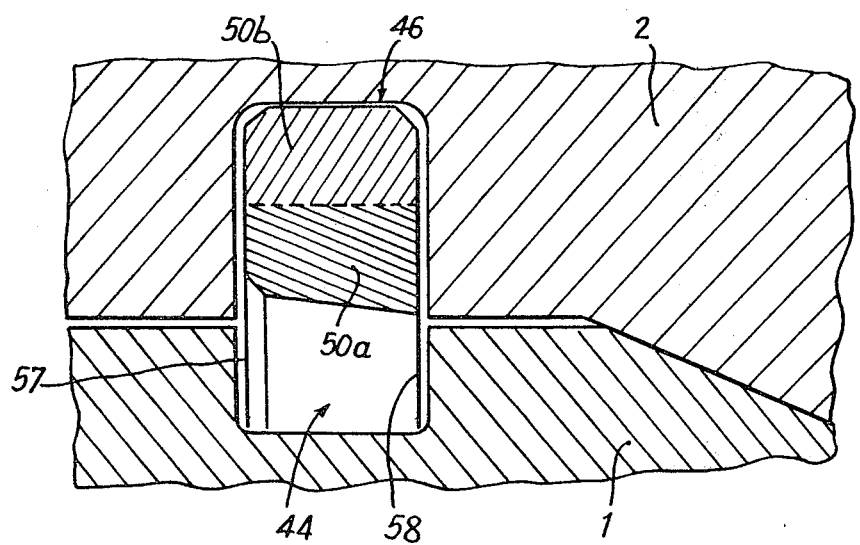

JOINTS FOR PIPES, PARTICULARLY INTENDED FOR THE OIL INDUSTRY

The present invention relates to a joint for pipes, more specifically steel pipes intended particularly for the oil industry.

Joints used in the oil industry are known in which the ends of two male members are joined by means of a female member, each male member being provided with a thread, e.g. a frustum-shaped thread, which engages in a corresponding female thread in the female member.

In the case of such joints, it is known that the unscrewing torques of the male members are proportional to the tightening torques. The proportionality constant is dependent on parameters such as the grease used during screwing and the surface state of the members and generally has a value between 1 and 1.3.

However, for certain applications, it is desirable to increase the unscrewing torques of the joint and various solutions have already been proposed in this connection.

The first and obvious solution consists of increasing the screwing torque, but this solution has limitations due to the mechanical strength of the joint or the tightening means or also due to the marking of members by the screwing jaws.

Another possibility consists of using an adhesive grease, but this solution requires special surface preparation and the drying times required are often incompatible with the laying times. In addition, the unscrewing of such threaded—adhered joints requires the use of special unscrewing means and methods.

The present invention aims at providing a joint for pipes in which the unscrewing torque exceeds the natural unscrewing torque.

The present invention consequently relates to a joint for a pipe of the type in which a threaded end of a male member is screwed into a female member having a corresponding thread, wherein the male member has on its outer surface a circumferential groove and the female member has on its inner surface a circumferential groove which, in the screwed position, faces the groove of the male member, a spring ring being provided for simultaneously engaging in the said grooves, at least one of the grooves having an adequate radial depth to permit the retraction of the ring when the male member is being engaged in the female member.

Unscrewing is only possible though shearing the spring ring, which makes it possible to obtain unscrewing torques which are approximately 1.3 to 20 times the screwing torque. This arrangement makes it possible to obtain a calibrated unscrewing torque which dows not take the place of the natural unscrewing torque of the joints and instead supplements the latter.

The spring ring may either be located in the vicinity of the end of the male member or in the vicinity of the end of the female member.

The same joint may also have a plurality of spring ring means according to the invention particularly by placing a spring ring in the vicinity of each end of the thread.

Such joints can in particular be used for pipes exposed for long periods to e.g. bending or torsional stresses or to impacts such that the natural unscrewing torque can be reached relatively easily. These joints are particularly useful when the pipes exposed to these stresses must still maintain a perfect sealing, but are no longer accessible after laying, which is particularly the case with submarine pipelines for hydrocarbons.

The joint according to the invention also has other advantages which may make its use advantageous in cases where the increase in the unscrewing torque is not the main objective.

For example, it is known in connection with the threaded joints used in the oil industry that it is advantageous to have a tightening torque limiting means to prevent any permanent deformation of the joint in the case of a tightening overtorque. To this end, a metal abutment is often provided.

However, the spring ring according to the invention simultaneously engages in the grooves of the male and female members, making it possible to replace the known abutments because it is also subject to shearing stress during screwing. Moreover, the arrangement according to the invention can be used in joints having one or more abutments, which provides additional reliability and security, so that the maximum screwing torque of the joint can be increased.

In the case of a joint where a female member joins two male members, the invention also ensures a clearly defined positioning of one of the male members in the female member during the screwing or unscrewing of the other male member. If the invention is also only applied from one side of the joint, unscrewing is preferential and always takes place from the other side.

One of the advantages of the invention is that it makes it possible to ensure a clearly defined positioning of the male member in the female member after tightening. This is particularly necessary for certain joints in which a male member is fitted in the factory to a female sleeve and another male member is fitted on site. To ensure that the male member fitted on site is correctly positioned in the assembly formed in the factory, the male member fitted in the factory must itself be accurately positioned.

In the joint according to the invention, due to the fact that the spring ring is simultaneously engaged in a groove of the male member and in a groove of the female member in the screwing position, the position of the male member in the female member can be accurately determined because it is only dependent on the machining tolerances of the grooves.

According to a preferred variant of the invention, the groove of the female member is deeper than the radial thickness of the spring ring.

The fitting of the male member in the female member can then be performed by retracting the spring ring into the groove of the female member during the screwing of the male member, the spring ring engaging in the groove of the male member at the end of screwing.

This retraction of the spring ring into the groove of the female member is advantageously carried out by the male member. To this end, the male member has a conical surface which tapers towards its end which, during its introduction into the female member, is liable to bring about the opening of the spring ring previously positioned in the groove of the female member.

According to a particular variant, this conical surface of the male member is a sealing surface able to cooperate with a complementary surface of the female member in the screwing position. However, it is possible to use a conical surface especially provided for this purpose in order to obviate any damage to the sealing surface through friction on the inner surface of the spring ring.

According to another variant, the radially inner surface of the spring ring is conical. Its largest opening is provided in the groove of the female member on the side at which the male member is introduced in order to cooperate with a surface of said member during its introduction and thus cause the opening of the spring ring.

Obviously, conical surfaces may be provided both on the male member and on the spring ring in order to permit an easier opening of the latter during the introduction of the male member.

Preferably, at rest, the spring ring has a diameter which is smaller than that of the bottom of the groove of the male member and the groove of the male member has a depth which is less than the radial thickness of the spring ring.

Thus, in use, the spring ring bears by its radial inner periphery on the bottom of the groove of the male member. This ensures the centring of the spring ring in such a way that during unscrewing shearing thereof takes place over its entire periphery.

The spring ring is preferably a ring which is slotted at one point on its periphery, but it is obvious that it is also possible to use other shapes permitting a radial expansion of the ring.

The spring ring can be made from the same steel as that of the joint, although this is not necessary.

In particular, when the essential objective of the joint according to the invention is to obtain a high unscrewing torque, the spring ring is preferably made from a steel having a lower yield point than that of the material in which the grooves have been machined to prevent the deterioration of the faces of the grooves perpendicular to the joint axis during unscrewing.

In other applications of the invention, like that where the essential objective is to obtain a precise positioning of the male member relative to the female member it is possible to use a steel with a yield point which is higher than that of the material in which the grooves have been made, e.g. a spring steel.

In a special embodiment of the invention, the spring ring is constituted by a circular bimetallic member which, at ambient temperature, behaves like the ring described hereinbefore, but which as a result of raising the temperature can spontaneously deform so that it is applied to the bottom of the groove which completely contains the ring during the engagement of the other member.

Thus, a joint is obtained which, in the screwed state, has all the qualities described hereinbefore and which can be unscrewed either by shearing the ring which behaves like a normal ring, or by raising the joint, prior to its unscrewing, to an adequate temperature to ensure that as a result of the bimetal effect the ring engages with the bottom of the groove which can completely contain it, so that the joint can be unscrewed with a torque which corresponds to the friction alone.

The invention is described in greater detail hereinafter relative to non-limitative embodiments and with reference to the attached drawings, wherein show:

FIG. 1 an axial sectional view of a first embodiment of a joint according to the invention.

FIG. 2 an axial sectional view of a joint according to a second embodiment of the invention.

FIG. 3 a sectional view on a larger scale showing in the case of a joint according to the invention the introduction of a male member into a female member provided with a spring ring.

FIG. 4 a view similar to FIG. 3 showing a subsequent stage.

FIG. 5 a view similar to FIGS. 3 and 4 showing the joint after the male member has been completely screwed into the female member.

FIG. 6 an axial sectional view of a joint according to the invention showing a first application thereof (increase of the unscrewing torque).

FIG. 7 a view similar to FIG. 6 showing another application of the invention (positioning of the members and increasing the screwing and unscrewing torque).

FIG. 8 a larger scale sectional view of a joint according to a variant of the invention.

FIG. 9 a variant of FIG. 5 with a bimetallic joint.

FIG. 10 the bimetallic joint in the unscrewing position after reheating the joint.

In order to improve the legibility and understanding of the drawings, the proportions have not been respected. This more particularly applies with regards to the clearances between spring rings and the grooves which receive them.

FIG. 1 shows a joint according to the invention in which a male member 1 is screwed into a female member 2. External conical threads 3 are provided at the end of the male member 1 to cooperate with corresponding conical threads 4 made on the inner surface of the male member 2. These threads are preferably trapezoidal threads which disappear at the outer surface of male member 1.

The female member 2 is, for example, a sleeve having at its other, not shown end, another thread which is symmetrical to thread 4 in order to cooperate with one end of another male member and thus form a joint between said other male member and male member 1.

The joint according to the invention also has an abutment surface 5 at the end of male member 1 able to cooperate with an abutment surface 6 of the female member. Sealing is brought about by means of a conical sealing surface 7 of the male member which cooperates with a corresponding conical sealing surface 8 of the female member.

Male member 1 also has a circumferential groove 9 in its cylindrical portion between the end of thread 3 and sealing surface 7. In the same way, the female member has a circumferential groove 10 in its cylindrical portion between the end of thread 4 and sealing surface 8.

When the male member 1 is completely screwed into female member 2, i.e. when the abutment surfaces 5 and 6 are in contact, grooves 9 and 10 face one another in the manner shown in FIG. 1. In this position, grooves 9 and 10 define an annular space 11 in which is located a spring ring 12. The spring ring is arranged in such a way that it is simultaneously engaged in grooves 9 and 10.

A more detailed description will be provided hereinafter of the way in which spring ring 12 is placed in annular space 11 in connection with FIGS. 3 to 5. However, it is pointed out that once in the position shown in FIG. 1, the joint according to the invention cannot be disassembled by unscrewing male member 1 until spring ring 12 has been sheared.

FIG. 2 shows another joint according to the invention. In this joint, a male member 21 has at its end a cylindrical outer thread with two stages 23, 23'. In the same way, female member 22 has at its end a corresponding cylindrical internal thread with two stages 24, 24'. Threads, 23, 23' and 24, 24' are, for example, trapezoidal threads.

An external abutment surface 25 of the male member also cooperates with a corresponding abutment surface 26 of the female member and sealing is ensured from the radially internal side by a conical sealing surface 27 of the male member cooperating with a corresponding conical sealing surface 28 of the female member 22.

As in the preceding case, a circumferential groove 29 is formed in the cylindrical part of male member 21 between the end of thread 23' and sealing surface 27. In the same way, a circumferential groove 20 is provided in female member 22 in its cylindrical portion between the end of thread 24' and sealing surface 28.

When surfaces 25 and 26 abut, grooves 29 and 30 face one another and define an annular space 31 within which is located a spring ring 32 in such a way that it is simultaneously engaged in grooves 29 and 30.

As in the previous case, members 21 and 22 may only be unscrewed after spring ring 32 has been sheared.

The spring ring of the joint according to the invention, as well as those parts of the male and female members in which the circumferential grooves are made, will now be described in greater detail with reference to FIG. 5.

The joint shown in FIG. 5, as hereinbefore, comprises a male member 41 and a female member 42. A circumferential groove 44 is formed in a cylindrical outer portion 43 of male member 41 and a circumferential groove 46 is formed in an internal cylindrical portion 45 of the male member 42.

Moreover, a conical surface 47 is provided on male member 41 on the side of the end of said member relative to groove 44. For example, this conical surface can be a sealing surface cooperating with a corresponding conical sealing surface 48 on female member 42, but this is not obligatory.

In the assembled position of the joint, such as for example, the position shown in FIGS. 1 and 2, grooves 44 and 46 face one another and define an annular space 49 in which is positioned the spring ring 50.

Groove 44 of male member 41 has two lateral faces 51, 52 perpendicular to the joint axis and a cylindrical base surface 53 coaxial to the joint. In the embodiment described, the base surface 53 is connected to the lateral faces 51, 52 by toroidal surfaces.

In the same way, groove 46 has two lateral faces 54, 55 which, in the represented embodiment are perpendicular to the joint axis and a cylindrical base surface 56 coaxial to the joint. Base surface 56 is connected to the lateral faces 54, 55 by toroidal surfaces.

The spring ring 50 is slotted at a point on its periphery having two lateral faces 57, 58 and an outer face 59, which is a cylindrical surface perpendicular to lateral faces 57, 58.

However, inner surface 60 of ring 50 is a conical surface, whose apex is located on the side on the end of the male member. Conical surface 60 is connected from its small diameter side to the lateral face 58 by a rounded portion and from its larger diameter side to the lateral face 57 by a chamfer 61.

Moreover, groove 46 of female member 42 has a depth a which is greater than the radial thickness b of ring 50, whilst groove 44 of male member 41 has a depth c which is less than the radial thickness b.

Finally, split ring 50 has an internal diameter in the rest position (i.e. when no externally directed force makes it open) which is less than the diameter of the base surface 53 of groove 44 in such a way that when it is in the position shown in FIG. 5, its conical surface 60 bears on surface 53 by its smaller diameter face.

The assembly of the joints described hereinbefore takes place in the manner shown in FIGS. 3 and 4.

As shown in FIG. 3, ring 50 is firstly introduced into groove 46 of female member 42 by compressing it radially inwards in such a way that it clears a cylindrical surface 45 and then expands in groove 46. Male member 41 is then engaged in female member 42 in the direction of arrow 70 by engaging the corresponding threads shown, for example, in FIGS. 1 and 2.

When conical surface 47 of male member 41 engages with the edge of ring 50 formed between its inner surface 60 and chamfer 61, it brings about the centering of ring 50 on the axis of the joint and then its radial expansion.

This expansion continues up to the position shown in FIG. 4 where it is then brought about by contact between the conical surface 60 of ring 50 and the edge of male member 41 formed between its cylindrical part 43 and its conical part 47. This expansion stops when said edge becomes level with the smaller diameter part of conical surface 60. During the subsequent advance of male member 41 into female member 42 in the direction of arrow 70, said smaller diameter part of surface 60 moves alongside surface 43 until the groove 44 of the male member faces groove 46 of the female member 42. Having been previously elastically expanded, ring 50 then contracts radially and engages in groove 44 to arrive at the position shown in FIG. 5.

The disassembly of the joint according to the invention takes place in the manner shown in FIG. 6 showing part of a joint of the type represented in FIG. 2.

To start to turn male member 71 relative to female member 72, it is firstly necessary to reach the natural unscrewing torque which is generally between 1 and 1.3 times the screwing torque. After a very limited rotation corresponding to an axial displacement of the members relative to one another approximately equivalent to the axial clearance of ring 50 in grooves 44 and 46, the ring bears against the lateral surface 54 of groove 46 of the female member and against lateral surface 52 of groove 44 of the male member.

On then increasing the unscrewing torque, there is firstly a crushing and then a shearing of the ring, so that it fractures and it is possible to completely unscrew the joint.

Obviously, the banding or hooping of the sealing cones 47, 48 is calculated in such a way that in the position shown in FIG. 6 where the unscrewing torque suddenly increases, the necessary sealing is ensured.

In addition, the unscrewing torque can be accurately calibrated as a function of the application of the joint according to the invention is illustrated in FIG. 7, which shows a joint between a male member 81 and a female member 82 having cylindrical threads corresponding to two stages 83, 83' and 84, 84' respectively. No abutment surface is provided in this joint which has an inner sealing cone formed by the sealing surface 87 of the male member and sealing surface 88 of the female member and an outer sealing cone formed by sealing surface 87' of the male member and sealing surface 88' of the female member.

As hereinbefore, a groove 44 is formed in the cylindrical part 43 of male member 81 between the end of the thread 83' and the conical sealing surface 87. In the same way, a groove 46 is formed in cylindrical part 45 of the female member between the end of thread 84' and the conical sealing surface 88. A spring ring 50 is engaged in grooves 44 and 46.

Moreover, another groove 44' is formed in the conical sealing surface 87' of male member 81 and a groove 46' is formed in the conical sealing surface 88' of female member 82. A second spring ring 50' is placed in grooves 44' and 46'.

This joint is assembled in the same way as the aforementioned joints, except that only the two rings 50, 50' are placed in grooves 46, 46' of the female member 82 prior to the introduction of male member 81. Radial expansion of the ring is brought about by their contact with the conical sealing surfaces 87, 87' of the male member.

As a joint of this type has no abutment, an excessive tightening torque could lead to a permanent deformation of female member 82 in the areas of its sealing surfaces 88, 88'. This disadvantage is obviated by the rings according to the invention. Thus, once rings 50 and 50' have been engaged in grooves 44 and 44' of male member 81 a very slight rotation makes ring 50 come into contact with the lateral face 58 of groove 46 of the female member and with lateral face 51 of groove 44 of the male member. In the same way, ring 50' comes into contact with the lateral face 58' of groove 46' of the female member and with lateral face 51' of groove 44' of the male member.

In this position, and which is shown in FIG. 7, the screwing torque suddenly increases, because screwing could only be continued by crushing and shearing rings 50, 50'. Thus, this arrangement protects the joint from the permanent deformations which could result from an excessive screwing torque.

Obviously, the joint of FIG. 7 is disassembled in the same way as the previously described joints, i.e. by shearing spring rings 50, 50'.

In all the above-described joints, the radial expansion of the spring ring takes place by means of a conical sealing surface of the male member.

The joint shown in FIG. 8 is a variant in which the expansion of the ring is brought about by means of a conical surface provided specifically for this purpose, which obviates any risk of possible damage to the sealing surfaces of the male member.

In this variant, a male member 91 is fitted to a female member 92 by means of complementary threads 93, 94. As hereinbefore, a groove 44 is formed in a cylindrical surface 43 of the male member and a groove 46 is formed in a cylindrical surface 45 of the female member. The male member has an abutment surface 95 able to cooperate with an abutment surface 96 of the female member, grooves 44, 46 facing one another when surfaces 95, 96 abut.

Male member 91 also has a conical sealing surface 97 able to cooperate with a corresponding conical sealing surface 98 of female member 92.

The conical sealing surface 97 of the male member is extended by a cylindrical surface 99 and then by a second conical surface 100. Spring ring 101 has a minimum internal diameter at rest which is greater than the diameter of the cylindrical surface 99 of male member 91. Thus, when male member 91 is engaged in female member 92 its sealing surface 97 passes over ring 101 without coming into contact therewith and cannot therefore be damaged. The expansion of ring 101 is then carried out by means of the conical surface 100, as described hereinbefore.

FIGS. 9 and 10 show a variant of FIG. 5 according to which the spring ring 50 is constructed with a bimetallic element constituted by a metal piece 50a located within the ring having a higher expansion coefficient than that of metal piece 50b constituting the outer part of ring 50.

As can be seen in FIG. 9, the bimetallic ring is shaped like that of FIG. 5 and serves the same function.

However, on heating the joint to an adequate temperature of e.g. 200° to 300° C., metal piece 50a expands more than metal piece 50b, ring 50 increases in diameter and is spontaneously applied to the bottom of groove 46, as can be seen in FIG. 10. It is then possible to unscrew the joint without having to shear ring 50.

It is clear that if during unscrewing the ring has to engage with the bottom of the groove made in the male member, the metal piece having the highest expansion coefficient must be positioned externally of ring 50.

Thus, the invention makes it possible to obtain very high unscrewing torques and also prevent disadvantages due to a screwing overtorque. It also ensures an accurate positioning of the male member in the female member. The grooves of the male and female members, whilst generally facing one another when the joint is assembled may be slightly staggered as a function of the operating mode.

Obviously, the axial sectional shape of the grooves and of the ring described in detail with references to FIG. 5, is in no way limitative. Any other shape permitting the radial expansion of the ring falls within the scope of the invention.

In the same way, the described joints have trapezoidal, cylindrical or conical threads, but the invention may also be applied to joints of other types.

It is obvious that the spring rings are not necessarily placed at the precise locations indicated in the drawings. In particular, it is possible to use a spring ring located in the vicinity of the end of the female member, like ring 58' in FIG. 7. In the same way, the use of the spring rings according to the invention is independent of the presence or absence of abutments or screwing limiting shoulders.

Furthermore, all the sealing surfaces described are conical surfaces, but the invention could obviously be used on joints having cylindrical sealing surfaces.

Finally, what has been stated hereinbefore with respect to the male and female members could be reversed, the spring ring being firstly placed in the groove of the male member and then, during screwing, retracted into said groove by a surface of the female member.

We claim:

1. In a pipe joint of the type in which a threaded end of a male member is screwed into a female member having a corresponding thread, the combination comprising a circumferential groove on the outer surface of said male member adjacent one end of its thread, a circumferential groove on the inner surface of said female member which, in the screwed position, faces said groove in said male member, a radially expansible and contractible spring ring simultaneously engaging in said grooves, at least one of said grooves having a sufficient radial depth to contain the entire radial thickness of the ring when the male member is being threaded into the female member, the simultaneous engagement of the ring in the groove of said male member and in the groove of said female member causing a substantial increase in the torque to be applied during the assembly or the disassembly of said joint.

2. A joint according to claim 1, wherein the groove of the female member has a depth greater than the radial thickness of the spring ring.

3. A joint according to claim 2, wherein the male member has a conical surface adjacent the groove therein which tapers towards the end of said male member and which, during the threading of the male member into the female member causes radial expansion of the spring ring previously placed in the groove of the female member to a diameter sufficient to enable the spring ring to enter the groove in the male member.

4. A joint according to claim 3, wherein said conical surface on said male member is a sealing surface that after expansion of said ring member sealingly engages a complementary seal surface on the female member when the joint is screwed together.

5. A joint according to claim 3, wherein the radially inner surface of the spring ring is conical and slides over said conical surface on said male member during threading in order to facilitate expansion of the spring ring.

6. A joint according to claim 2, wherein the spring ring has an internal diameter when relaxed which is smaller than the diameter of the bottom of the groove in the male member and wherein the groove in the male member has a depth which is less than the radial thickness of the spring ring.

7. A joint according to claim 1, wherein the spring ring is slotted at a point along its periphery.

8. A joint according to claim 1, wherein the spring ring is constituted by a bimetallic member which, by reheating the joint, can be positioned totally within said one groove in order to permit the disassembly of the joint without shearing of the spring ring being necessary.

* * * * *